United States Patent [19]

Makiel

[11] Patent Number: 4,520,082

[45] Date of Patent: May 28, 1985

[54] FUEL CELL GENERATOR

[75] Inventor: Joseph M. Makiel, Monroeville, Pa.

[73] Assignee: The United States of America as represented by the United States Department of Energy, Washington, D.C.

[21] Appl. No.: 510,451

[22] Filed: Jul. 1, 1983

[51] Int. Cl.³ .............................................. H01M 8/12
[52] U.S. Cl. .......................................... 429/26; 429/31
[58] Field of Search ....................... 429/17, 30, 31, 32, 429/33, 38, 39

[56] References Cited

U.S. PATENT DOCUMENTS

| | | | |
|---|---|---|---|
| 1,152,247 | 8/1915 | Walker | 429/148 |
| 2,385,127 | 9/1945 | Carlile | 136/166 |
| 3,520,731 | 7/1970 | Rightmire et al. | 136/86 |
| 3,799,809 | 2/1972 | Bohm et al. | 136/86 R |
| 4,169,917 | 10/1979 | Baker et al. | 429/26 |
| 4,200,682 | 4/1980 | Sederquist | 429/17 |
| 4,204,033 | 5/1980 | Meissner | 429/33 |
| 4,328,287 | 5/1982 | Sammells et al. | 429/15 |
| 4,374,184 | 2/1983 | Somers et al. | 429/17 |
| 4,395,468 | 7/1983 | Isenberg | 429/31 |

Primary Examiner—Donald L. Walton
Attorney, Agent, or Firm—B. R. Studebaker

[57] ABSTRACT

A high temperature solid electrolyte fuel cell generator comprising a housing means defining a plurality of chambers including a generator chamber and a combustion products chamber, a porous barrier separating the generator and combustion product chambers, a plurality of elongated annular fuel cells each having a closed end and an open end with the open ends disposed within the combustion product chamber, the cells extending from the open end through the porous barrier and into the generator chamber, a conduit for each cell, each conduit extending into a portion of each cell disposed within the generator chamber, each conduit having means for discharging a first gaseous reactant within each fuel cell, exhaust means for exhausting the combustion product chamber, manifolding means for supplying the first gaseous reactant to the conduits with the manifolding means disposed within the combustion product chamber between the porous barrier and the exhaust means and the manifolding means further comprising support and bypass means for providing support of the manifolding means within the housing while allowing combustion products from the first and a second gaseous reactant to flow past the manifolding means to the exhaust means, and means for flowing the second gaseous reactant into the generator chamber.

7 Claims, 5 Drawing Figures

FUEL CELL GENERATOR

GOVERNMENT CONTRACT CLAUSE

This invention was made or conceived in the course of or under a contract with the U.S. Department of Energy identified as number DE-AC-02-80-17089.

CROSS-REFERENCE TO RELATED APPLICATION

This application is related to the subject matter of pending U.S. patent application Ser. No. 321,137, now U.S. Pat. No. 4,395,468 entitled "Fuel Cell Generator" further identified by an Attorney Docket No. 49,487C, hereby incorporated by reference.

BACKGROUND OF THE INVENTION

1. Field of the Invention

This invention relates to solid electrolyte fuel cells, and more particularly, provides an improved generator system comprised of such cells.

2. Description of the Prior Art

High temperature solid electrolyte fuel cells such at those disclosed by the above-referenced application convert chemical energy into direct current electrical energy, typically at temperatures above 700° C. This temperature range is required to render the solid electrolyte sufficiently conductive for low power losses due to ohmic heating. With such cells, expensive electrode catalysts and refined fuels are not required. For example, carbon monoxide-hydrogen fuel mixtures can be used directly without conversion. Stabilized zirconia is a prime electrolyte candidate and is used in thin layers on ceramic tubular support structures. The support tubes for thin film high temperature solid oxide electrolyte cells are generally also made of stabilized zirconia and serve as ducts for one of the reactants, fuel or oxidant. This requires porosity in the support tubes.

A problem arises in the construction of generators because the fuel and oxidant, such as air, must be preheated to temperatures that require high temperature heat exchangers, such as those comprised of ceramics, a technology that is for present purposes economically unavailable. In fuel cells of the prior art, such as exemplified by the above-referenced application, fuel consumption is not complete and 5 to 15 percent will remain in the anode exhaust. Similarly, an oxidant, such as air, which typically also functions as a coolant, is depleted in the fuel cells, although the oxygen depletion of air is low. The depleted fuel is not utilized to its full capacity in production of electricity. The generator utilizes the non-electrochemical combustion reaction between the depleted fuel and the depleted oxidant, as well as the sensible heat contained in the reaction products, to provide preheating as necessary for the electrochemical reaction. Thus, the generator incorporates a high temperature preheater which eliminates the need for a separate high temperature heat exchanger.

Unfortunately, the use of such a preheater in the design set forth in the above-described application relies on cross-flow heat transfer. As a result, because the heat is generated in one axis and flows in a direction which is perpendicular to that axis, there are temperature variations within the preheater section which can result in different electrochemical reaction rates within the fuel cells and thereby result in inefficiencies within the generator itself.

What is needed is an apparatus for preheating within the fuel cell generator which will avoid temperature variations within the preheater section. Recognizing that the process conveyance tubes are of ceramic material, this apparatus must accomplish its preheating function in a manner which does not require unusual fabrication requirements of ceramic materials.

SUMMARY OF THE INVENTION

A high temperature solid electrolyte fuel cell generator comprising a housing means defining a plurality of chambers including a generator chamber and a combustion products chamber, a porous barrier separating the generator and combustion product chambers, a plurality of elongated annular fuel cells each having a closed end and an open end with the open ends disposed within the combustion product chamber, the cells extending from the open end through the porous barrier and into the generator chamber, a conduit for each cell, each conduit extending into a portion of each cell disposed within the generator chamber, each conduit having means for discharging a first gaseous reactant within each fuel cell, exhaust means for exhausting the combustion product chamber, manifolding means for supplying the first gaseous reactant to the conduits with the manifolding means disposed within the combustion product chamber between the porous barrier and the exhaust means and the manifolding means further comprising support and bypass means for providing support of the manifolding means within the housing while allowing combustion products from the first and a second gaseous reactant to flow past the manifolding means to the exhaust means, and means for flowing the second gaseous reactant into the generator chamber.

BRIEF DESCRIPTION OF THE DRAWINGS

The advantages, nature and additional features of the invention will become more apparent from the accompanying drawings in which.

DESCRIPTION OF THE PREFERRED EMBODIMENT

Figure 1:
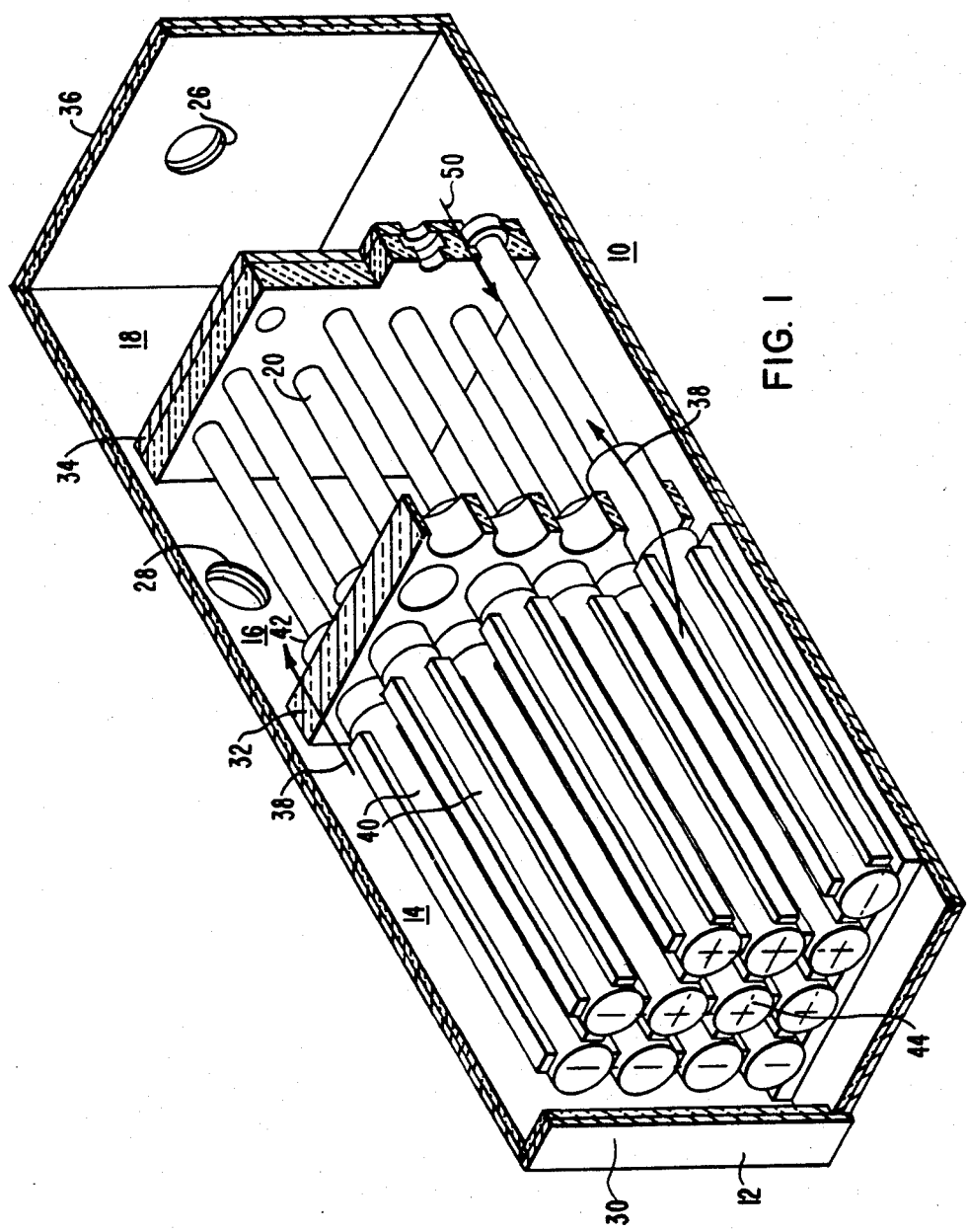
FIG. 1 is a broken perspective view of a fuel cell generator in accordance with the state of the art.
Figure 2:
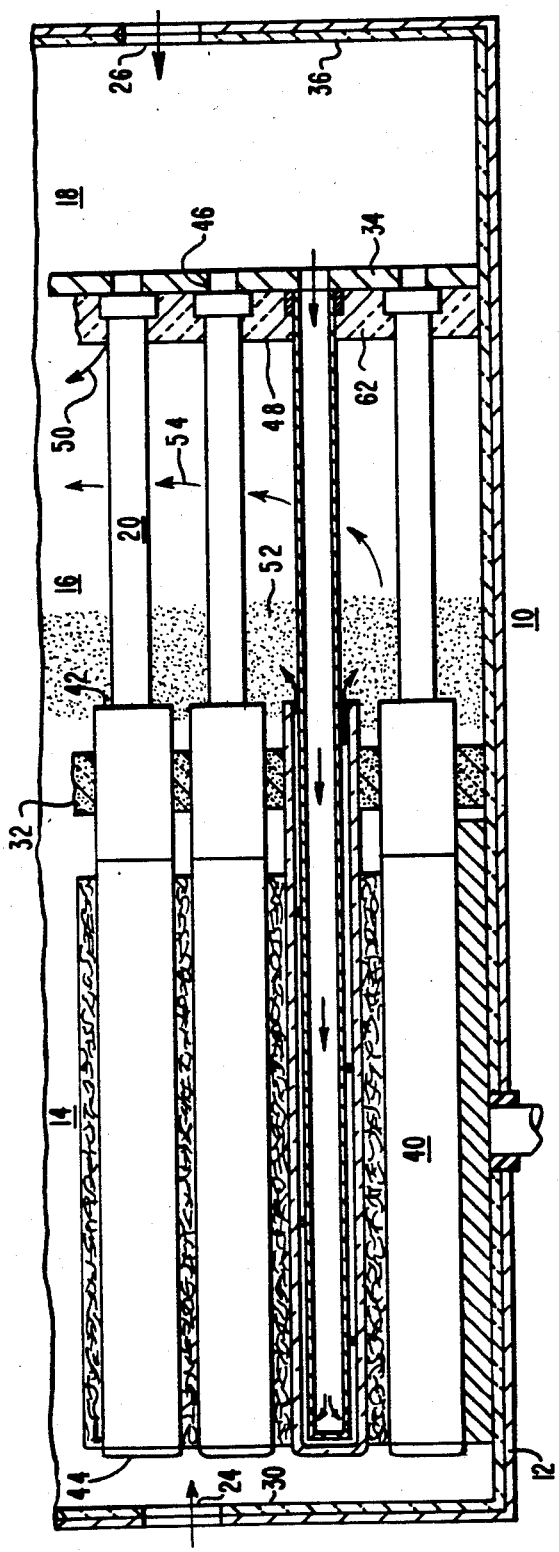
FIG. 2 is a view, partially in section, of a generator such as shown in FIG. 1 in accordance with the state of the art.

Referring now to FIGS. 1 and 2, there is shown a fuel cell generator 10 in accordance with the prior art including a gas-tight housing 12. The housing 12 surrounds a plurality of chambers, including a generating chamber 14 and a combustion product or preheating chamber 16. An oxidant inlet chamber 18 is also contained within the housing 12 for manifolding an oxidant into conduits 20. Penetrating the housing 12 is a fuel inlet port 24, an air inlet port 26, and a combustion product outlet port 28.

The generating chamber 14 extends between an end wall 30 of the housing 12 and a porous barrier 32. The preheating chamber 16 extends between the porous barrier 32 and a tube support structure such as a tube sheet 34. The oxidant inlet chamber 18 extends between the tube sheet 34 and another end wall 36 of the housing 12. The porous barrier 32 is designed to allow flow between the generating chamber 14, operating at an approximate pressure slightly above atmospheric, and the preheating chamber 16, operating at a slightly lower pressure, as indicated by arrow 38.

High temperature, elongated, solid oxide electrolyte annular fuel cells 40 extend between the preheating chamber 16 and the generating chamber 14. The cells have open ends 42 in the preheating chamber 16, and closed ends 44 in the generating chamber 14. The fuel cells are preferably tubular, including a solid oxide electrolyte sandwiched between two electrodes, supported on a tubular porous support.

The conduits 20 are supported at one end in the tube sheet 34 as shown in FIG. 2. The tube sheet 34 may be stainless steel, with bores 46 that fit loosely about the conduits 20 to allow free thermal expansion. The conduits 200 may be comprised of alumina, and the tube sheet may be covered with an insulation 48 such as low density alumina. A minor leakage of oxidant, as indicated by arrow 50, is acceptable.

The conduits 20 extend from the tube sheet 34 into the open end 42 of the fuel cells 40, a single conduit 20 corresponding to a single fuel cell. Each conduit 20 extends close to the closed end 44 of the cell. Each conduit is provided with a means for discharging a reactant medium into the fuel cell 40, such as an open end.

The porous barrier 32, which allows a throughput of depleted fuel, may be a porous ceramic baffle, such as one comprised of fibrous alumina felt, or ceramic plate segments with porous inserts such as ceramic wool plugs, surrounding each fuel cell 40.

During operation an oxidant such as air enters the inlet chamber 18 through inlet port 26. The chamber 18 functions as an inlet manifold for the individual conduits 20. Air enters the conduits at a temperature of approximately 600° C., and a pressure above atmospheric, being initially heated prior to entering the housing by conventional means such as a heat exchanger coupled with a blower. The air flows within the conduits 20, through the preheating chamber 16, where it is further heated to a temperature of approximately 800° C. The air then flows through the length of the conduit 20, being further heated to approximately 1000° C., and is discharged through the open end of the conduit 20 into the fuel cell 40. The air within the fuel cell electrochemically reacts at the fuel cell cathode, depleting somewhat in oxygen content as it approaches the open end 42 of the cell. The depleted air is discharged into the combustion product or preheating chamber 16.

A fuel, such as hydrogen or a mixture of carbon monoxide with hydrogen, is conveyed after preheating into the generating chamber 14 through fuel inlet port 24. The fuel flows over and about the exterior of the fuel cells, electrochemically reacting at the anode. The fuel inlet port 24 is preferably located near the closed ends 44 of the cells 40, and accordingly depletes as it approaches the porous barrier 32. The depleted fuel, containing approximately 5 percent to 15 percent of its initial energy content, diffuses through the barrier 32 and into the preheating chamber 16.

The combustion products, including oxygen depleted air and fuel, along with any air leaking into the preheating chamber 16 through the tube sheet 34, directly react exothermically. The heat of this reaction, which substantially combusts the fuel, along with the sensible heat of the depleted fuel and air, are utilized to preheat the incoming air. The combustion products are discharged through combustion product outlet port 28 at a temperature of approximately 900° C.

Shown on FIG. 2 is a shaded area 52 which represents the area within preheating chamber 16 in which combustion actually takes place. This combustion will generally be a very short distance, typically of less than 0.5 inches in length. The exhaust gases then flow to the combustion outlet port 28 as indicated by arrow 54. In general, the conduits 20 near the combustion outlet port 28 will receive a larger amount of heat transfer from the combustion reactants than those further from the outlet port 28. Thus, the conduits 20 in the preheating region 16 most distant from the combustion outlet port 28 may have significantly lower preheating than those close to the combustion outlet port 28. Such temperature variations within the preheating region 16 results in uneven preheating of the oxidant in the conduits 20. Since the electrochemical reaction and, thereforee, the generation of electricity in the fuel cells 40 is related to the temperature of the incoming reactants, this may result in significant differences in electrical power generation between various fuel cells within the same generator. Even if multiple combustion outlet ports located in the side walls of the housing very close to the tube sheet 34 are used there will still be temperature variations because an arrangement such as this would not provide equal distribution of heat to the inner conduits 20. What is needed is an axially located combustion outlet port. Such a solution, however, must be compatible with the axial supply of oxidant.

Figure 3:
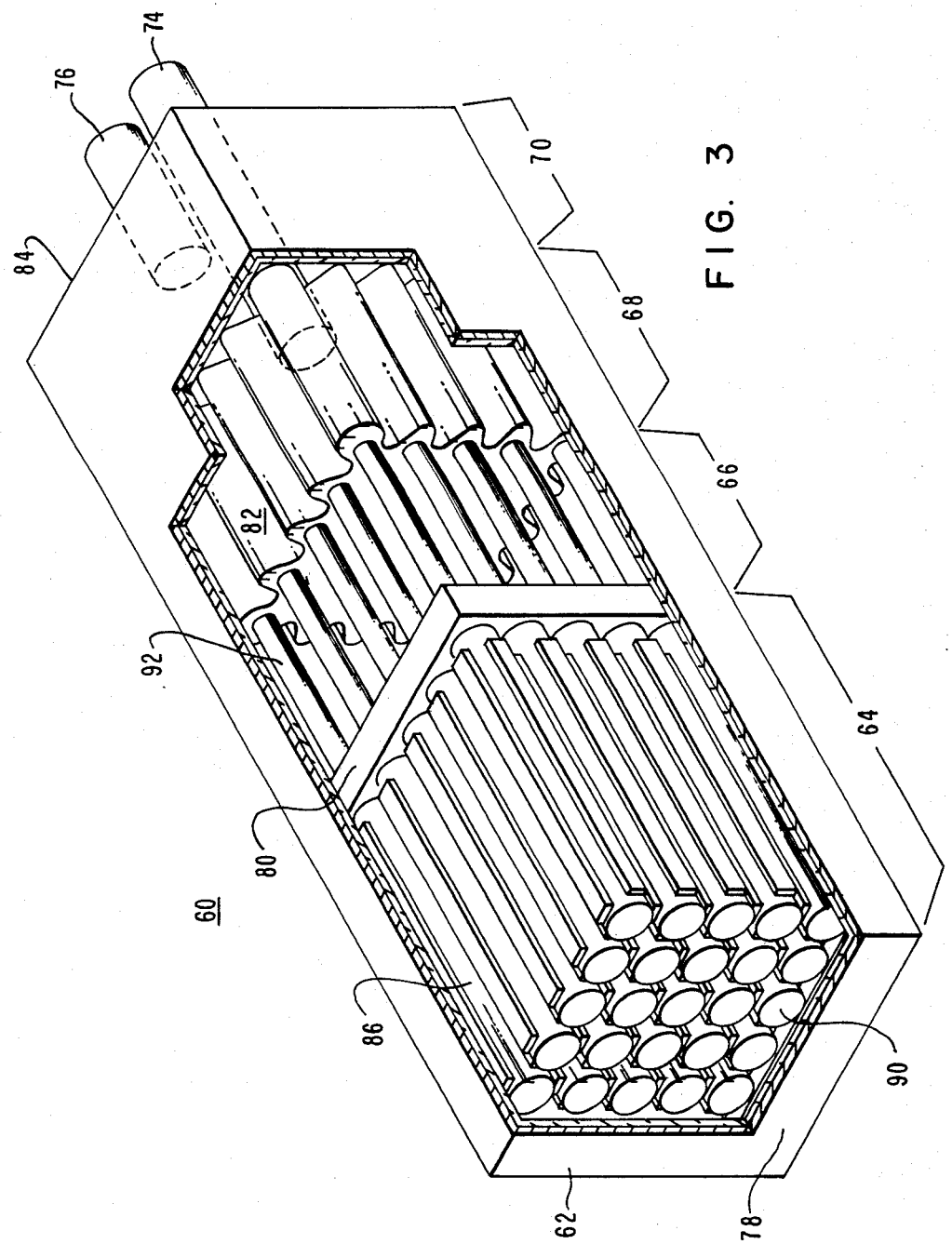
FIG. 3 is a broken perspective view of a fuel cell generator in accordance with the invention.
Figure 4:
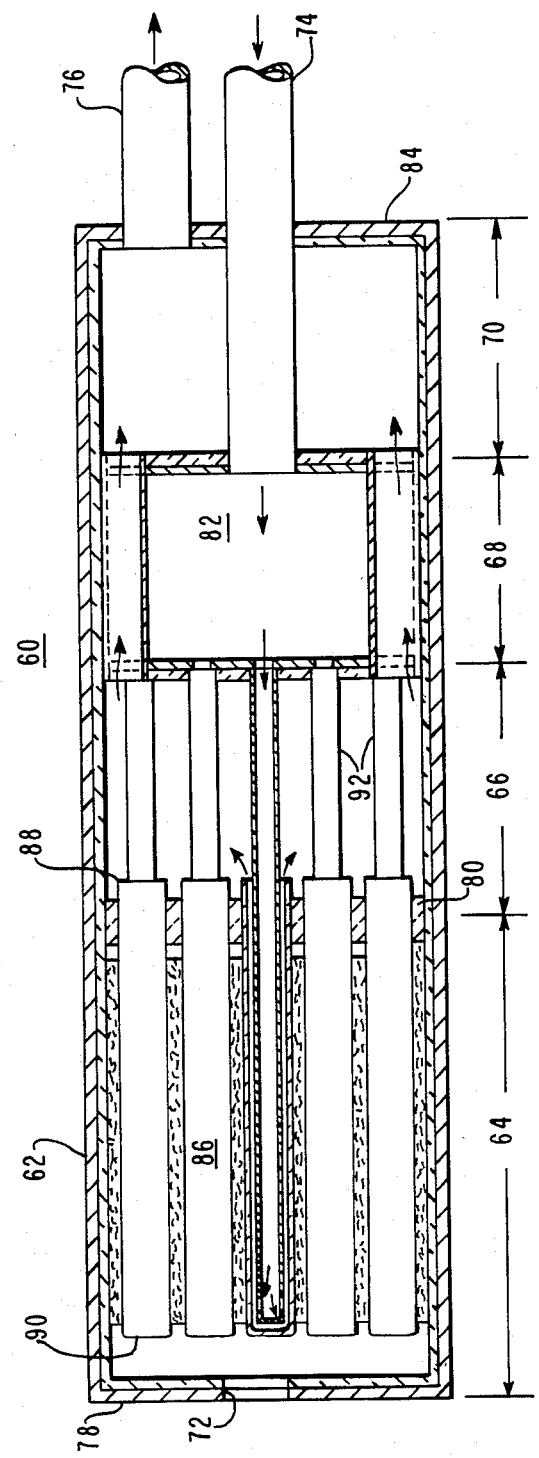
FIG. 4 is a view, partially in section, of a generator such as shown in FIG. 3 in accordance with the invention.

Looking now at FIGS. 3 and 4 there is shown a fuel cell generator 60 in accordance with the invention. A gas-tight housing 62 surrounds the generator. The housing 62 surrounds a plurality of plenums including a generating plenum 64, a combustion product plenum 66, an air manifold plenum 68 and an exhaust plenum 70. Penetrating the housing 62 are a fuel inlet port 72, an oxidant inlet port 74 and a combustion product exhaust port 76.

The generator plenum 64 extends between a first end wall 78 of the housing 62 and a porous barrier 80. The combustion products plenum 66 extends between the porous barrier 80 and an oxidant manifold 82. The oxidant manifold 82 is disposed within the oxidant manifold plenum 68. The exhaust plenum 70 extends from a second end wall 84 inwardly to the oxidant manifold 82.

High temperature elongated solid oxide electrolyte annular fuel cells 86 extend between the combustion products chamber 66 and the first end wall 78. The fuel cells 86 have open ends 88 in the combustion products chamber 66 and closed ends 90 in the generator plenum 64. The fuel cells are preferably tubular, including a solid oxide electrolyte, sandwiched between two electrodes supported on a tubular porous support.

Tubular conduits 92 extend in one direction through the porous barrier 80, into each of the fuel cells 86 and substantially to the closed end 90 of each of the fuel cells 86, and in the opposite direction from the porous barrier through the combustion products plenum 66 and penetrate the oxidant manifold 82. Each of the conduits 92 is hollow and will typically be provided with a means for discharging a reactant medium into the fuel cell 86 such as by an open end. Similarly, the end of the conduit 92 extending into the oxidant manifold 82 will have an open end.

The porous barrier 80 which allows a throughput of deleted fuel may be a porous ceramic baffle such as one comprised of fibrous alumina felt or ceramic plate segments with porous inserts such as ceramic wool plugs surrounding each fuel cell 86.

Figure 5:
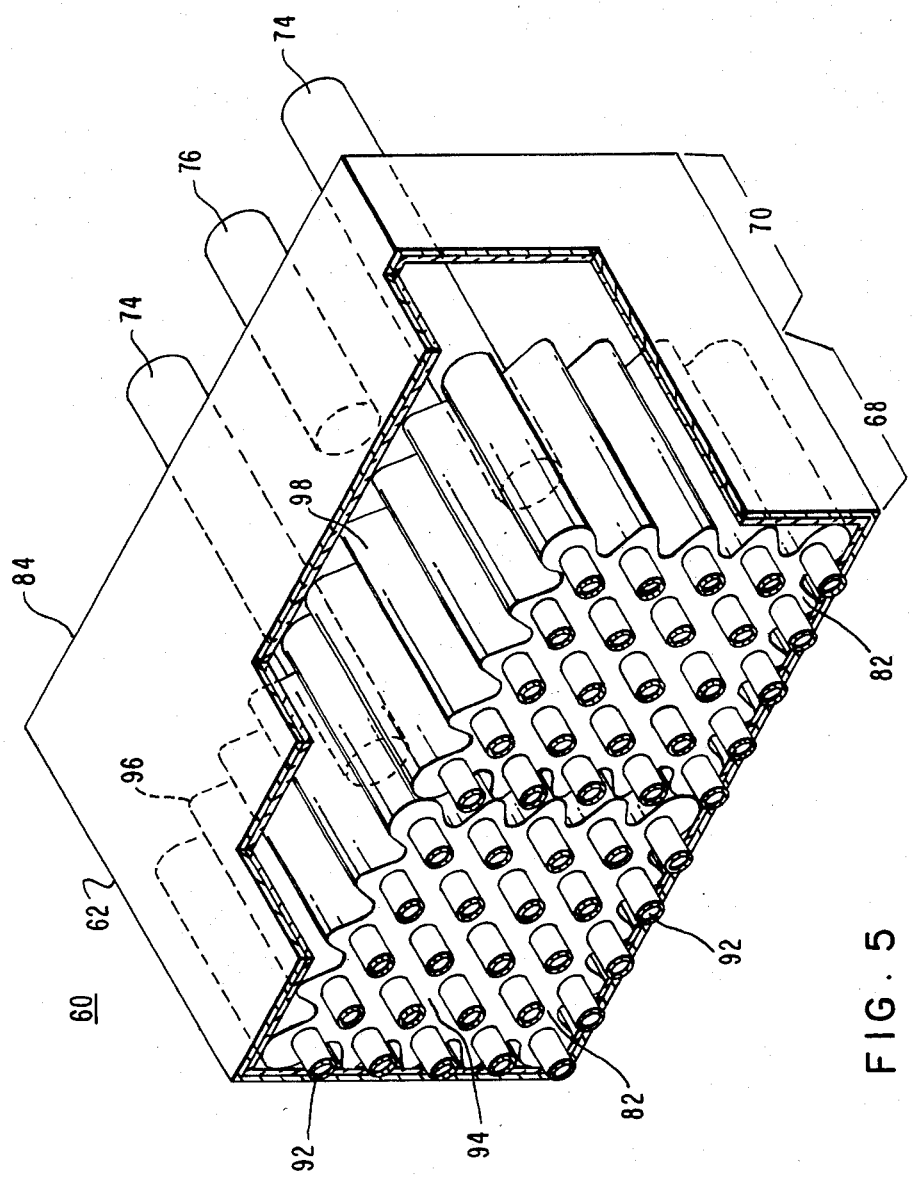
FIG. 5 is a view, partially in section, of an alternate manifolding arrangement of a fuel cell generator in accordance with the invention.

Looking now to FIG. 5 there is shown a cutaway view of a partial fuel cell primarily showing the oxidant manifold plenum 68 and the exhaust plenum 70. Shown in FIG. 5 are two side-by-side oxidant manifolds 82. Each oxidant manifold 82 has a conduit tube sheet 94 and an inlet tube sheet 96. The conduits 92 penetrate the conduit tube sheet 94. The oxidant inlet ports 74 penetrate the inlet tube sheet 96. These two tube sheets 94, 96 are substantially parallel and connected by corrugated walls 98. It can be seen that the gaps between the housing 62 and the corrugated walls 98, or similarly, between adjacent corrugated walls 98 provides for flow communication between the combustion products plenum 66 and the exhaust plenum 70.

In the prior art generators, it was necessary to provide insulation to the tube sheet 34. In accordance with the invention, this may not be necessary because of the cooling effect of the incoming oxidant. Consequently, the entire oxidant manifold 82 may be made of uninsulated metal to improve heat transfer and fabrication characteristics.

During operation an oxidant, such as air, enters the oxidant manifold 82 through the oxidant inlet port 74. Air enters the conduit at a temperature of approximately 600° and a pressure above atmospheric, being initially heated prior to entering the housing by conventional means such as a heat exchanger coupled with a blower. The oxidant manifold 82 distributes the air into the conduits 92. The air then flows within the conduits 92 through the combustion product chamber 66 where it is further heated to a temperature of approximately 800° C. The air then flows through the lengths of the conduits 92 which are internal to the fuel cells 86, being further heated to approximately 1000° C. and is discharged through the open end of the conduit 92 into the fuel cell 86. As the air flows back towards the fuel cell open ends 88 to the annulus formed between the conduits 92 and the fuel cell 86, the air electrochemically reacts at the fuel cell cathode depleting somewhat in oxygen content as it approaches the fuel cell open ends 88. The depleted air is discharged into the combustion products plenum 66.

A fuel, such as hydrogen or a mixture of carbon monoxide with hydrogen, is conveyed after preheating into the generator plenum 64 through fuel inlet port 72. The fuel flows over and about the exterior of the fuel cells 86 electrochemically reacting at the anode. The fuel inlet port 72 is preferably located near the fuel cell closed ends 90 and accordingly depletes as it approaches the porous barrier 80. The depleted fuel containing approximately 5 percent to 15 percent of its initial fuel content diffuses through the barrier 80 and into the combustion products plenum 66.

The combustion products, including oxygen depleted air and fuel, along with any air leaking into the combustion products plenum through the conduit tube sheet 94, directly react exothermically. The heat of this reaction, which substantially combusts the fuel, along with the sensible heat of the depleted fuel and air, are utilized to preheat the incoming air conveyed by the conduits 92 passing through the combustion products plenum 66.

The combustion products flow out of the combustion products plenum 66, through the gaps formed between the corrugated walls 98 and either the housing 62 or adjacent corrugated walls 98. Heat from the combustion products is transferred to the oxidant manifold, both along the corrugated walls 98 and at the conduit tube sheet 94 and inlet tube sheet 96. The combustion products then pass into the exhaust plenum and thence out of the fuel cell generator through the combustion products exhaust port 76.

There are several advantages which accrue from this apparatus. First, the hot combustion products can transfer heat to the cooler incoming air for a significantly longer distance when compared to the prior art combustion products discharge port 28. Instead of being discharged immediately after the occurrence of combustion, the hot combustion products are allowed to pass in heat transfer communication over the entire length of the conduits 92, thence the length of the oxidant manifold 82, before finally being discharged from the exhaust plenum 70. As a consequence, a significantly higher portion of the total available heat is transferred to the incoming air stream, thus improving the efficiency of the fuel cell and reducing the need for external heating sources.

Second, although the oxidant manifold shown has a 5×5 matrix, this number can be changed to accomodate various matrices or shapes, provided the gaps formed by the corrugated walls 98 remain. Consequently, if operating experience showed that conduits 92 on the interior of a particular matrix was being heated insufficiently, the matrix could be changed without undue hardship to reduce the temperature anomalies. For instance, rather than a 5×5 matrix, perhaps a 5×3 or a 3×3 matrix would be more practicable.

Third, it can be seen that the oxidant manifold 82 as a modular unit lends itself to manufacturing ease. It can be seen that the fuel cells 86 and associated conduits 92 and porous barrier 80 could all be assembled external to the housing 62 and then merely placed within the housing 62 prior to sealing. Additionally, the simplicity in manifolding and the ability to use straight conduits 92 should result in significant cost savings.

I claim:

1. A high temperature solid electrolyte fuel cell generator comprising:
   a housing means defining a plurality of chambers including a generator chamber and a combustion products chamber;
   a porous barrier separating said generator and combustion products chambers;
   a plurality of elongated annular fuel cells each having a closed end and an open end, said open end disposed within said combustion product chamber, said cells extending from said open end through said porous barrier and into said generator chamber;
   a conduit for each said cell, each said conduit extending into a portion of each said cell disposed within said generator chamber, each said conduit having means for discharging a first gaseous reactant within said fuel cell;
   exhaust means, for exhausting said combustion product chamber, said exhaust means penetrating said housing means;
   manifolding means for supplying said first gaseous reactant to said conduits, said manifolding means disposed within said combustion product chamber between said porous barrier and said exhaust means, said manifolding means further comprising support and bypass means for providing support of said manifolding means within said housing while allowing combustion products from said first gaseous reactant and a second reactant to flow past said manifolding means to said exhaust means; and means for flowing said second gaseous reactant into said generator chamber.

2. The generator in accordance with claim 1 wherein said manifolding means comprises:

a first tube sheet;

a second tube sheet penetrated by said conduits, said second tube sheet disposed between said first tube sheet and said porous barrier; and wherein said support and bypass means comprises corrugated sides, said sides sealingly connected to said tube sheets.

3. The generator in accordance with claim 1 wherein said manifolding means is comprised of uninsulated metal.

4. A high temperature solid oxide electrolyte fuel cell generator comprising:

housing means defining a plurality of plenums, including a fuel inlet plenum and a combustion plenum;

an oxidant inlet manifold disposed within said combustion plenum and comprising a support structure;

a porous barrier, said barrier separating said fuel plenum and said combustion plenum;

a plurality of annular solid oxide electrolyte fuel cells having a closed end disposed within said fuel inlet plenum, said cells extending through said porous barrier and having an open end disposed within said combustion plenum;

a plurality of oxidant inlet conduits in fluid communication with said oxidant inlet manifold and supported by said support structure, each said conduit extending into and having an oxidant outlet disposed within a corresponding fuel cell;

means for supplying fuel to said fuel inlet plenum;

means for supplying an oxidant to said oxidant inlet manifold;

means for exhausting combustion products from said combustion plenum, wherein said oxidant inlet manifold is disposed between said means for exhausting combustion products from said combustion plenum; and conveying means for conveying said combustion products past said oxidant inlet manifold.

5. The generator in accordance with claim 4 wherein said oxidant inlet manifold further comprises members sealingly attached to said support structure and wherein said conveying means comprises corrugations formed in said members.

6. The generator in accordance with claim 5 wherein said housing means comprises flat sides and wherein said oxidant inlet manifold members contact said housing means flat sides forming a plurality of passages for conveying said combustion products past said oxidant inlet cavity.

7. A solid oxide electrolyte fuel cell generator comprising:

a housing in which is disposed a generator plenum, a combustion plenum and an exhaust plenum;

a porous barrier separating said generator plenum from said combustion plenum;

a manifold separating said combustion plenum from said exhaust plenum;

a plurality of high temperature elongated solid oxide electrolyte annular fuel cells, each said fuel cell having an open end and a closed end and being disposed through said porous barrier, said closed end being disposed within said generator plenum and said open end being disposed within said combustion plenum;

conduits supported at one end by said manifold and extending through said combustion plenum, each said conduit extending into a separate fuel cell through the associated open end of said fuel cell, each said conduit further being in flow communication with said manifold interior; and wherein said manifold further comprises:

a first tube sheet, for support of said conduits, penetrated by said conduits;

a second tube sheet; and corrugated sides providing flow communication between said combustion plenum and said exhaust plenum;

a first reactant inlet for inletting a first reactant through said housing and into said generator plenum;

a second reactant inlet for inletting a second reactant through said housing, through said exhaust plenum and into said manifold through said second tube sheet; and a combustion products exhaust for exhausting combustion products from said exhaust plenum.

* * * * *